Jan. 5, 1954 L. W. ETCHART 2,665,016
HYDRAULIC LOADER AND HANDLING MEANS FOR TRUCKS
Filed Dec. 7, 1951 3 Sheets-Sheet 1

INVENTOR
LEONARD W. ETCHART

BY
ATTORNEYS

Jan. 5, 1954 L. W. ETCHART 2,665,016
HYDRAULIC LOADER AND HANDLING MEANS FOR TRUCKS
Filed Dec. 7, 1951 3 Sheets-Sheet 2

INVENTOR
LEONARD W. ETCHART

BY
ATTORNEYS

Jan. 5, 1954            L. W. ETCHART            2,665,016

HYDRAULIC LOADER AND HANDLING MEANS FOR TRUCKS

Filed Dec. 7, 1951            3 Sheets-Sheet 3

INVENTOR
LEONARD W. ETCHART

BY
*Semmes, Keegin, Robinson & Semmes*
ATTORNEYS

Patented Jan. 5, 1954

2,665,016

UNITED STATES PATENT OFFICE 2,665,016

HYDRAULIC LOADER AND HANDLING MEANS FOR TRUCKS

Leonard W. Etchart, Glasgow, Mont.

Application December 7, 1951, Serial No. 260,505

5 Claims. (Cl. 214—78)

1

This invention relates generally to self-loading apparatus and more particularly to a load handling attachment for vehicles having load carrying bodies.

Apparatus of this general type is known in the art and is usually characterized by a number of inherent disadvantages. Among these are an unnecessarily complicated structure rendering installation and operation complex rather than simple while initial and maintenance costs are such as to render the apparatus impractical; a lack of flexibility of use so that the apparatus is strictly of the "single purpose" type and hence not desirable economically; and a lack of ruggedness of construction requiring a careful handling which is not generally feasible during normal operations.

Accordingly, the chief object of the present invention is to provide an improved self-loading apparatus for trucks, etc. which will obviate the above-mentioned disadvantages characterizing prior art structures.

Another important object of the present invention is to provide an improved self-loading attachment for vehicles which is simple in construction and which may be readily attached to or detached from conventional trucks, etc.

A further important object of the present invention is to provide a load carrying attachment for trucks, etc. which will scoop up a load as the vehicle moves along and swing it upwardly and rearwardly over the cab so as to dump the load in the vehicle body.

A still further important object of the present invention is to provide a self-loading attachment which includes means for freeing material from its position on the ground so that it may be readily scooped up.

Another important object is to provide an improved adjustable self-loading apparatus which may also act as a fence post driver and which includes variable means for aiding the upward swing of the fork or scoop while cushioning the downward swing, as desired.

Other objects and advantages of the invention will become apparent during the course of the following description.

In its broadest aspects, the invention comprises a power actuated rake or scoop attachment adapted for pivotal attachment to a vehicle body which will loosen material as necessary and lift it from the ground and load it into the vehicle body, the attachment including means for assisting its upward swing and cushioning its downward swing and other means adapting it for fence post driving.

2

In the drawings I have shown one embodiment of the invention. In this showing:

Figure 1:
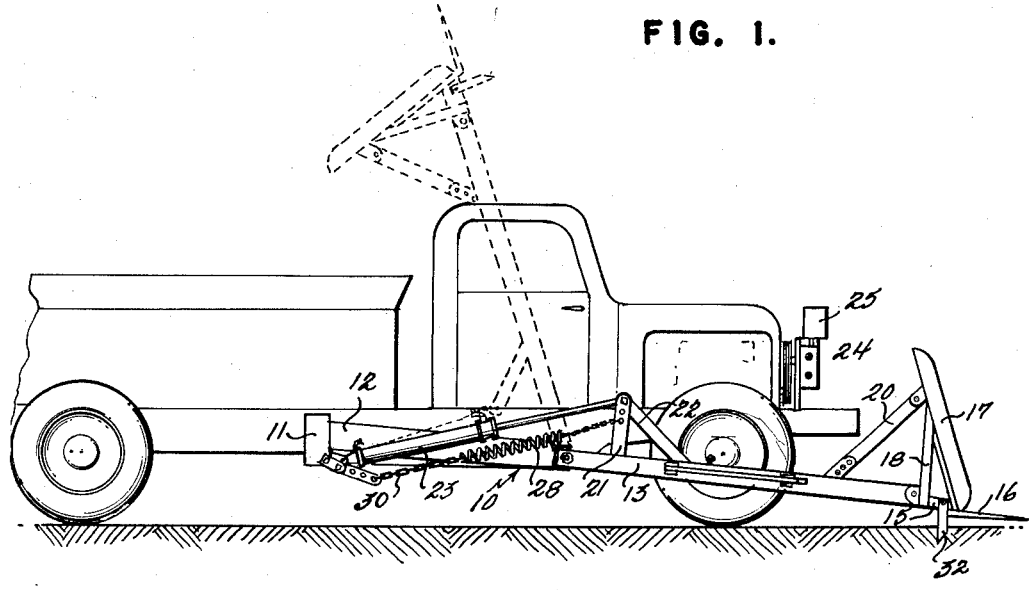
Figure 1 is a side elevational view of the self-loading attachment comprising the present invention showing it operatively mounted on a conventional truck.
Figure 2:
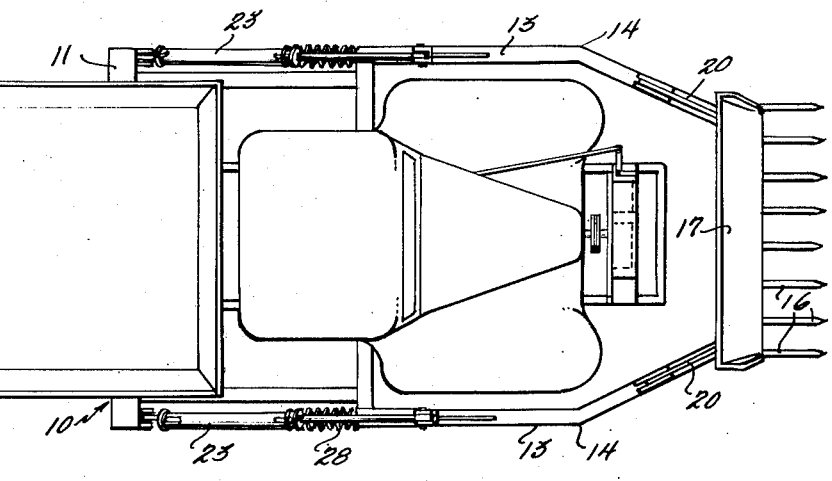
Figure 2 is a top plan view thereof.
Figure 3:
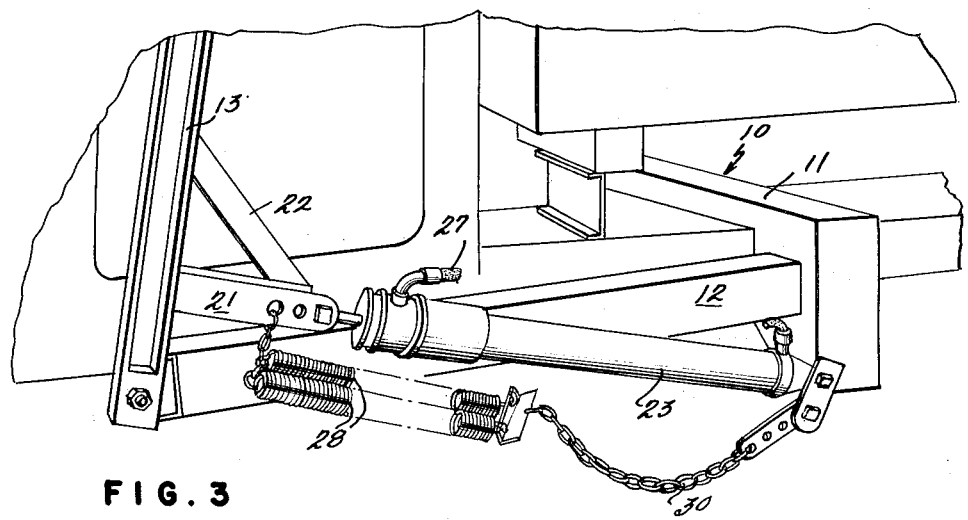
Figure 3 is a fragmentary side elevational view to an enlarged scale of the fork operating and cushioning means looking from the opposite side of the truck as seen in Figure 1.

Referring to the drawings, numeral 10 generally designates a rectangular frame, the transverse members 11 of which are fixed to the chassis of a conventional truck under the bed of its load carrying body. The frame members 11 project laterally of the sides of the truck and are connected by a pair of side frame members 12 thus forming a strong rigid box frame.

A pair of forwardly extending arms 13 are pivotally connected to the front ends of the side frame members 12, and adjacent the front end of the truck, taper inwardly as at 14 and terminate at and have a pivotal connection with a scoop or fork 15 having tines 16. The rear side 17 of the fork 14 is strengthened by a vertical brace 18 and the angular position of the fork as a whole may be adjusted with respect to the arms 13 by means of a pair of adjustable links 20.

Figure 4:
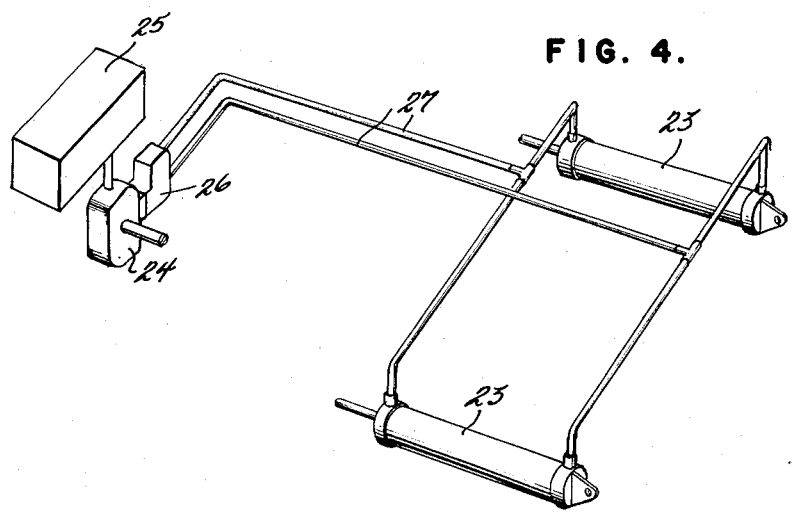
Figure 4 is a perspective diagrammatic view of the power source for the operating means.
Figure 5:
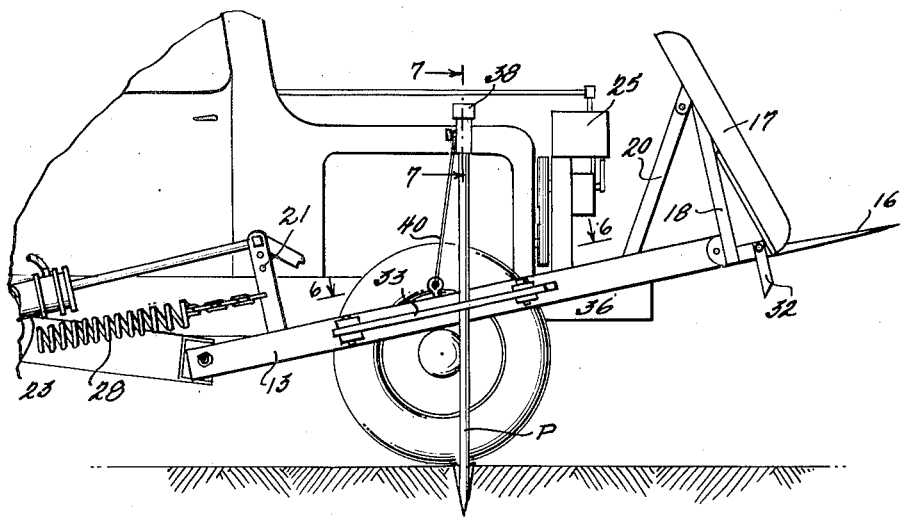
Figure 5 is a side elevational view of the invention showing it in use as a fence post driver.

A lever arm 21 projects upwardly from each of the fork arms 13 adjacent their pivot points and is rigidly braced thereon by a bar 22. A double acting hydraulic cylinder 23 is pivotally mounted by a bracket to each end of the rear frame member 11 and its piston rod is pivotally connected to the upper end of the lever arms 21. The hydraulic system is schematically shown in Figure 4 and comprises a pump 24 which may be driven from the truck engine, a reservoir or tank 25 for hydraulic fluid, a control valve 26 which is normally positioned in the cab of the truck and conduits 27 for conducting hydraulic fluid to either end of the hydraulic cylinders 23.

It will be readily apparent that the admission of pressure fluid to either side of the hydraulic cylinders 23 will act through the lever arms 21 to raise the fork 15 to the dotted line position of Figure 1 and lower it as desired. The simple but effective structure disclosed also eliminates the need for stops in either up or down position as placing the control valve 26 in neutral will hold the fork in any desired position due to the hydraulic lock.

Another feature of the invention resides in the use of readily detachable tension springs 28 which are mounted under the hydraulic cylinders 23 and also connected at one end to the lever arms 21 and at their other end by a chain 30 to the brackets on the frame members 11. When the fork is in the lowered position, the springs 28 are under tension so that they act to assist the raising of the fork 15 while cushioning the lowering thereof. If heavy loads are being handled, additional springs may be readily attached so that maximum efficiency may be had from a minimum sized hydraulic cylinder. Thus the use of large cylinders for heavy loads is avoided.

An important feature of the invention resides in the use of a plurality of ripper bars 32 which are mounted for rearward pivoting movement only at spaced points transversely along the fork 15. These bars pivot rearwardly during the scooping up of the material to be loaded which may comprise any bulky material such as manure, silage, chopped hay, snow, gravel, rock, etc. Such materials are often piled on the open ground and become matted and frozen or stuck thereto. By lowering the fork 15 so that the ripper bars 30 engage the material and drive the truck in reverse, the material is readily ripped loose from the ground or other material and may then be scooped up by driving forwardly.

Figure 6:
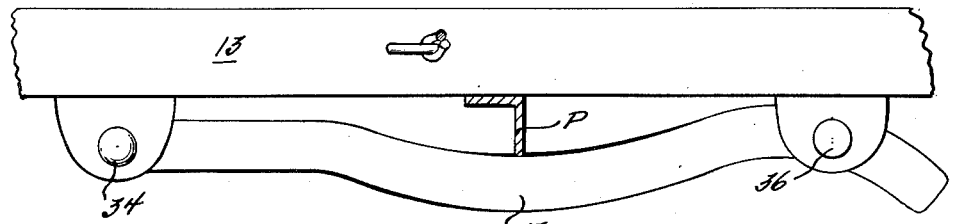
Figure 6 is a horizontal sectional view of the fence post positioning means, taken on the line 6—6 of Figure 5.
Figure 7:
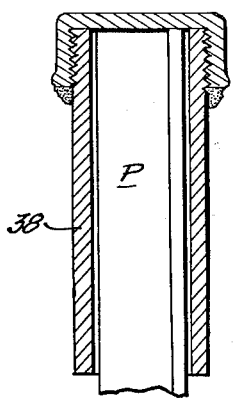
Figure 7 is a vertical sectional view of the fence post driving cap, taken on the line 7—7 of Figure 5.

Another important feature of the invention resides in the means which enable the fork to be used as a fence post driver. This comprises a confining and guiding arm 33 generally arcuate in shape which is pivoted at one end as at 34 to one of the fork arms 13 (Figure 6) and may be closed around a post P and latched to the fork arm by means of a pin 36. A tubular cap 38 which is connected to the fork arm 13 by means of a chain or cable 40 is placed over the upper end of the post P and hydraulic lowering of the fork 15 will then force the post into the ground while being held in proper position by the guiding arm 33.

It will now be apparent that the attachment comprising the present invention will readily scoop up material and swing it up over the cab into a position adjacent the truck body where the back 17 of the fork 15 will act as a discharge spout and that the hydraulic operating means will hold the fork in any adjusted position. Moreover, the efficiency of the apparatus is enhanced by the supplemental lifting and cushioning action of the springs 28, the adjustability of the back 17 of the fork, the rearwardly pivoting ripper bars 32 and the post driving assembly.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A work handling attachment for trucks and the like, comprising a frame for attachment to the chassis of a truck and having transverse end members connected by a pair of longitudinal side members, a working unit comprising a pair of forwardly directed one piece arms, pivotally mounted for vertical swinging movement on the forward ends of respective side members, and connected at their free ends, a corresponding pair of double acting fluid pressure operated power means pivotally mounted at the rear end of said frame and including forwardly projecting piston rods, means for selectively controlling said power means, upwardly directed, perpendicular levers fixed to respective arms, forwardly of their pivot points, with their upper extremities terminating in a horizontal plane spaced above that of the pivotal points of said arms, braces rigidly connecting the upper ends of said levers to forward points on respective arms, the projecting ends of said piston rods being pivotally connected directly to the upper ends of said levers adjacent the brace connections, for raising and lowering said arms about their pivots, a work-engaging element carried by at least one of said arms, and spring means respectively connected at one end to the frame adjacent the pivotal mountings of said power means with their other ends connected to the upstanding levers on said arms, said spring means lying substantially parallel with respective piston rods, and being tensioned when the working unit is in lowered position, whereby they are adapted to assist the power means in raising the unit and act as a cushion when the latter approaches its extreme lowered position.

2. An attachment as claimed in claim 1, wherein said work engaging element comprises a scoop for materials to be loaded into said truck.

3. An attachment as claimed in claim 2, including rearwardly pivoting ripper bars, fixed to said scoop to loosen material to be handled, on the rearward movement of said truck, for presentation to said scoop on forward movement.

4. An attachment as claimed in claim 1, wherein said work engaging element comprises a fence post driving device.

5. An attachment as claimed in claim 4, including a fence post guide, and means actuated by said arms for pressing a fence post into the ground on the downward swing of the arms.

LEONARD W. ETCHART.

References Cited in the file of this patent

UNITED STATES PATENTS

| Number | Name | Date |
|---|---|---|
| 1,320,970 | Beaty | Nov. 4, 1919 |
| 1,458,775 | Nilson | June 12, 1923 |
| 1,791,979 | Sharp | Feb. 10, 1931 |
| 2,227,624 | Benbow et al. | Jan. 7, 1941 |
| 2,302,702 | Leschinsky | Nov. 24, 1942 |
| 2,441,591 | Owen | May 18, 1948 |
| 2,498,144 | Thomas | Feb. 21, 1950 |
| 2,510,445 | Way | June 6, 1950 |
| 2,519,136 | Jochim | Aug. 15, 1950 |
| 2,551,897 | Notestein | May 8, 1951 |
| 2,566,547 | Bartlett | Sept. 4, 1951 |
| 2,571,113 | Crosby | Oct. 16, 1951 |
| 2,613,912 | Jordan | Oct. 14, 1952 |